(12) United States Patent
Chandane

(10) Patent No.: US 7,187,394 B2
(45) Date of Patent: Mar. 6, 2007

(54) USER FRIENDLY SELECTION APPARATUS BASED ON TOUCH SCREENS FOR VISUALLY IMPAIRED PEOPLE

(75) Inventor: Sanjiv Mahadeo Chandane, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 10/264,981

(22) Filed: Oct. 4, 2002

(65) Prior Publication Data

US 2004/0066422 A1  Apr. 8, 2004

(51) Int. Cl.
*G06F 3/00* (2006.01)
*G06F 17/60* (2006.01)

(52) U.S. Cl. ............... 345/865; 715/845; 715/854; 715/762

(58) Field of Classification Search ........... 715/729, 715/865
See application file for complete search history.

(56) References Cited

U.S. PATENT DOCUMENTS

| | | | | |
|---|---|---|---|---|
| 5,412,189 | A * | 5/1995 | Cragun | 235/379 |
| 6,061,666 | A * | 5/2000 | Do et al. | 705/43 |
| 6,384,743 | B1* | 5/2002 | Vanderheiden | 341/21 |
| 2003/0071859 | A1* | 4/2003 | Takami et al. | 345/865 |
| 2004/0051746 | A1* | 3/2004 | Hejza Litwiller | 345/865 |

OTHER PUBLICATIONS

Gregg C. Vanderheiden; Entitled: "Cross Disability Access to Touch Screen Kiosks and ATMs"; Available from http://trace.wisc.edu/docs/ihci97_cross_disability/x_disab.html; (5 Pages).

Gregg Vanderheiden, Chris Law; Entitled: "Eronomics [sic] of a Non-Visual Touchscreen Interface: A Case Study"; Available from http://trace.wisc.edu/docs/touchscren_ergonomics2000/ergonomics.html; (8 Pages).

Gregg Vanderheiden, Chris Law and David Kelso; Entitled: "Cross Product, Cross Disability Interface Extensions: EZ Access"; Available from http://trace.wisc.edu/kiosks/ez/resna_ez_access_paper.html; (4 Pages).

Authors: Unknown; Entitled:"Use of audio-haptic interface techniques to allow nonvisual access to touchscreen appliances"; Available from http://trace.wisc.edu/docs.audio_haptic_interfaces/audio_h.html; (8 Pages).

Authors: Unknown; Entitled: "Making Information/Transaction Machines(ITMs) Accessible"; Final Report, Spring 2000; Available from http://trace.wisc.edu/world/kiosks/itms/ (3 Pages).

Authors: Unknown; Entitled:News Release—"New Braille Keyboard designed for kiosks and ATMs";Available from http://www.kiosks.org/articles/pr12040a.html (1 Pages).

(Continued)

*Primary Examiner*—Raymond J. Bayerl
*Assistant Examiner*—Sabrina Greene
(74) *Attorney, Agent, or Firm*—T. Rao Coca; Anthony V. S. England

(57) ABSTRACT

A selection apparatus providing user friendly interface for visually impaired people. The selection apparatus may contain a touch screen and a guide structure. The guide structure is disposed along the touch buttons in the touch screen, and contains touch points corresponding to the touch buttons. The touch points are designed such that a different sensation is felt when a user slides an object (e.g., finger) along the selection structure. An exit may be designed to help lead the object from each touch point to corresponding touch button. Thus, a visually impaired person may slide a finger along the guide structure, feel a touch points and use the associated exit to locate a corresponding touch button.

8 Claims, 2 Drawing Sheets

OTHER PUBLICATIONS

Peter Korn; Entitled: Architecture of an Automatic Teller Machine Usable by All Using The Java Platform; Available from http://www.sun.com/access/articles/wp-aatm/#blind; (4 Pages).

Authors: Unknown; Entitled: "Anatomy of a Touchscreen System"; Available from http://trace.wisc.edu; (1 Page).

Chris Law and Gregg Vanderheiden; Entitled: "The Development of a Simple, Low Cost Set of Universal access Features for Electronic Devices"; Available from http://trace.wisc.edu; (8 Pages).

* cited by examiner

USER FRIENDLY SELECTION APPARATUS BASED ON TOUCH SCREENS FOR VISUALLY IMPAIRED PEOPLE

BACKGROUND OF THE INVENTION

1. Field of the Invention

The present invention relates to touch screen based selection apparatus used in places such as transaction kiosks (ATM machines), and more specifically to a method and apparatus to make such selection apparatus more user-friendly to visually impaired people.

2. Related Art

Selection apparatuses are often implemented using touch screens. An example touch screen is described in a document entitled, "Anatomy of a Touchscreen System"; Available from http://trace.wisc.edu, Authors: UNKNOWN. In a common scenario, a menu of choices is displayed on such a touch screen and a user selects among the choices by touching a specific portion on the touch screen. The selection information is often passed to a processing system which performs an action (or actions) associated with the selection.

Such selection apparatus are used in places such as transaction kiosks (e.g., ATM machine to perform routine banking operations). An example architecture of an ATM machine is described in a document entitled, "Architecture of an Automatic Teller Machine Usable by All Using The Java Platform", Author: PETER KORN, available from the following URL: http://www.sun.com/access/articles/wp-aatm/#blind.

It is often desirable to allow visually impaired people to use touch screen based selection apparatus. For example, in some countries such as USA, compliance with laws (e.g., Americans with Disabilities Act (ADA)) requires that public terminals be usable by visually impaired people.

At least for such reasons, attempts are made to facilitate even the visually impaired people to use touch screen based selection apparatus. An example of such attempt is described in a document entitled, "Making Information/Transaction Machines (ITMs) Accessible"; Final Report, Spring 2000; Available from the following URL: http://trace.wisc.edu/world/kiosks/itms/.

One challenge with making touch screen based selection apparatus usable by visually impaired people is that such people may not be able to see the displays on touch screens. Accordingly, such people may find it challenging to locate the specific portion of a touch screen to make a selection. As a result, touch screens based selection apparatus are often augmented with various approaches to simplify the selection task for the visually impaired people.

In one prior approach, touch screen based selection apparatus are complemented with audio systems which further guide a visually impaired person by audio instructions in making a selection. For example, in a document entitled, "Cross Disability Access to Touch Screen Kiosks and ATMs", by Gregg C. Vanderheiden (hereafter "Vanderheiden I"), available from the following URL: http://trace.wisc.edu/docs/ihci97_cross_disability/x_disab.html, several techniques are described as 'EZ Access Techniques'.

In a first EZ access technique, a "Quick Read" feature is provided in which a user presses a green diamond button to have a presently touched item on a touch screen read out loud. However, the feature may not aid a visually impaired person to quicky locate an item of interest.

In an alternative EZ access technique (described in Vanderheiden I), referred to as "Talking Touch and Confirm", a user may explore the screen with his/her fingertip. Touching items on a screen causes the corresponding option to be read out. Acoustic cues are given to guide the individual in exploring the screen. To actually activate (select) the item, the user merely needs to press a pre-specified button. Even this technique does not aid the user in quickly locating a desired choice as the user may continue to search for the desired choice for a long time before locating the choice.

In another alternative technique (described in Vanderheiden I) referred to as "List Mode", a solid reference/anchor point (the edge of the screen) is provided which users can use to guide their motion. By moving their fingers up and down the edge of the screen, the users can find all of the information and action items. The list mode approach may be complemented with the Talking Touch and Confirm approach noted above to enable selection of a desired choice. The implementation of the edge may add substantially to the overall cost as sensors may need to be present in the edge to sense the movement of fingers/objects.

Several variations and enhancements to the approaches noted above have been attempted and/or described. For example, a document entitled, "Eronomics [sic] of a Non-Visual TouchscreenInterface: A Case Study", by Gregg C. Vanderheiden (hereafter "Vanderheiden II"), available from the following URL, describes the above techniques, the lessons learned, results and the training modules employed to train the users: http://trace.wisc.edu/docs/touchscren_ergonomics2000/ergonomics.html The techniques are summarized in further detail in a document entitled, "Cross Product, Cross Disability Interface Extensions: EZ Access", Authors: Gregg C. Vanderheiden et al (hereafter "Vanderheiden III"), at the following URL: http://trace.wisc.edu/kiosks/ez/resna_ez_access_paper.html In another document entitled, "The Development of a Simple, Low Cost Set of Universal access Features for Electronic Devices", by Chris Law and Gregg Vanderheiden (hereafter "Law"), several techniques and design principles are noted. Example principles (requirements) include, (A) At any point in time there are a finite number of information items and control choices that a user has to work with; (B) Combining discoverability, simplicity and speed; (C) Standard controls cannot easily be identified independently by people who cannot see, cannot read, or do not understand symbols; (D) Some people cannot perform simultaneous/chorded functions (cannot perform more than one task at a time); (E) Some people do not understand or are unable to memorize product procedures, and should not have to refer to the manual; (F) Access features in public and unfamiliar devices must be fast to learn and easy to comprehend for first-time users; (G) A Standard symbol for EZ Access will help indicate its presence on a device; (H) EZ Access should not force changes to regular operation; (I) Public devices have different requirements and constraints than personal devices; (J) Transitioning between regular operation and EZ Access operation should be seamless; and (K) Adding accessibility features should not significantly add to the cost of the device.

Another implementation is described in a document entitled, "Use of audio-haptic interface techniques to allow nonvisual access to touchscreen appliances"; Available from http://trace.wisc.edu/docs/audio_haptic_interfaces/audio_h.html. The document notes various elements and principles for audio-haptic interface techniques. The document describes various approaches by which a Talking Finger Technique (many ways similar to the techniques in Vanderheiden I, II and III above) can be made more usable by visually impaired people. Most of the techniques address the layout of options on a touch screen, audio augmentations as a user moves finger around the screen, organization of different accesses, etc. However, a visually impaired person may continue to spend substantial amount of time in locating a desired choice of interest.

In another prior approach, a speech recognition apparatus may be used to enable a visually impaired person to simply speak the choices of interest, and the speech recognition apparatus processes the sounds to recognize the choice spoken. Unfortunately, speech recognition systems may not accurately decipher the accents of various people and may thus not be considered acceptable at least in some environments. In addition, the systems may be expensive to purchase/implement.

In another alternative approach, a braille key board may be provided along with transaction kiosks. Such key-boards may be available from www.keyboards.com. as described in a news release entitled, "New Braille Keyboard designed for kiosks and ATMs", as noted at URL—http://www.kiosks.org/articles/pr12040a.html. Unfortunately not all visually impaired people may be trained in braille, and thus the solution may not be acceptable in several situations.

What is therefore needed is touch screen based selection apparatus which is user-friendly for visually challenged people.

SUMMARY OF THE INVENTION

A system provided according to an aspect of the present invention includes a touch screen containing multiple touch buttons, and a guide structure disposed along the multiple touch buttons. The guide structure may contain multiple touch points which provide a different sensation when a person guides an object along the guide structure. A touch point may correspond to a specific one of the touch buttons.

A processor may cause multiple choices to be displayed on the touch screen, with each choice being displayed associated with a corresponding one of the touch buttons. A person can slide a finger along the guide structure to determine a touch point. The touch button corresponding to the touch point may then be easily located.

As the guide structure can be implemented cost-effectively, the marginal additional cost for facilitating the selection, may be minimal. In addition, the selection of choices may be simplified as a person merely needs to guide a finger (object) along the guide structure to at least position the finger close to the selection choices. Additional cost savings can be recognised as the amount of touch area on a touch screen can be reduced due to the simplification of the manner in which a person is able to locate the choices presented.

In an embodiment, the system further contains multiple exits, with each exit being designed to lead the object from a corresponding touch point to a corresponding touch button. Thus, a person can identify a location corresponding to a touch button by first identifying a touch point based on the different sensation and then use the corresponding exit to locate the corresponding touch button.

The guide structure may further contain a reference point. An audio enhancement (e.g., a speaker and an audio controller) may be designed to read out the choices presently displayed on a display area, with each choice being associated with a number which represents a number of touch buttons a corresponding choice is located from the reference point.

As the selection of a desired choice is simplified according to various aspects of the present invention, the extent (total touch area) of the touch area can be reduced. The overall cost of implementing a system may also be reduced as a result.

The guide structure may be implemented with different shapes and structures. In an embodiment, the guide structure contains a groove and each touch point is implemented as a bump in the groove. In an alternative embodiment, the guide structure is implemented as a projected structure and each touch point is implemented as a depression.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

FIG. (FIG.) 1 depicts portion 100 of a selection apparatus illustrating the manner in which a person may conveniently select a choice in a menu.

DETAILED DESCRIPTION OF THE PREFERRED EMBODIMENTS

1. Overview and Discussion of the Invention

A touch screen based selection apparatus according to an aspect of the present invention contains a guide structure having multiple points ("touch points) which provide a different touch sensation when a user slides a finger along the guide structure. A convenient exit may be provided to a corresponding selection button (contained in the touch screen) from each point. Thus, a visually impaired person ("person") may slide a finger along the guide structure, feel a different sensation at the touch points, and use the exists to locate the touch buttons. The selection task may be simplified due to such an arrangement.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the invention.

2. User Interface

Figure 1:
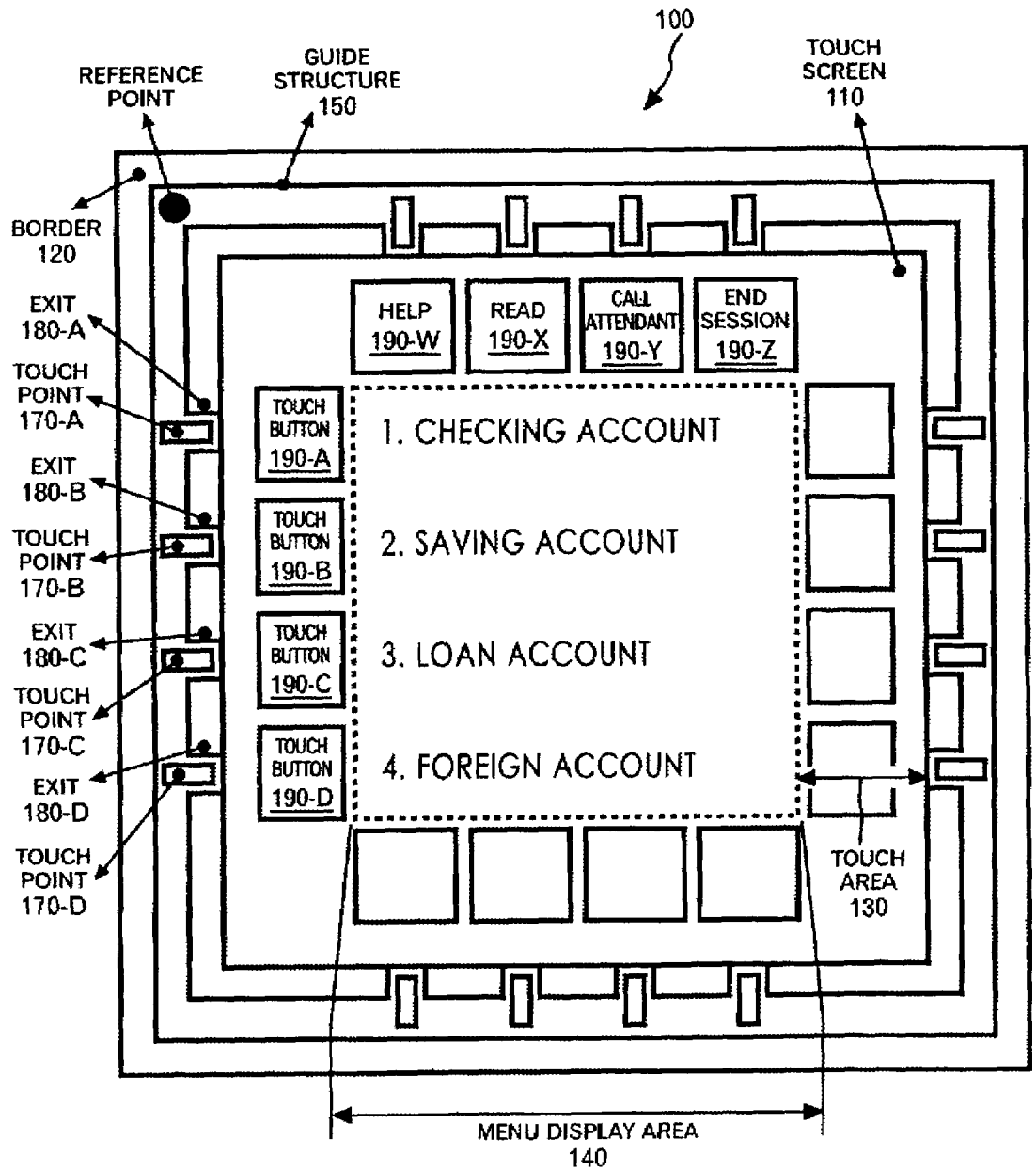

FIG. 1 depicts portion 100 of a selection apparatus illustrating the manner in which a person may conveniently select a choice in a menu. Portion 100 is shown containing touch screen 110 surrounded by border 120. Touch screen 110 is shown divided into two portions, i.e., touch area 130 and menu display area 140. Border 120 is shown containing guide structure 150 and exits 180-A through 180-D. The sub-portions (areas) as relevant to various aspects of the present invention are described below in detail.

Menu display area 140 is generally used to display the menu choices (and other messages). For illustration, the selection apparatus is assumed to be contained in an ATM machine, and menu display area 140 is shown displaying four choices in the vertical direction of the left hand side: (1) Checking account (2) Savings account (3) Loan Account, and (4) Foreign account. In the top horizontal direction, four options are displayed: (1) Help; (2) Read; (3) Call Attendant; and (4) End Session. A user generally selects among the menu choices by touching on touch area 130 as described below.

Touch area 130 is shown containing touch buttons spread across four regions (i.e., upper, bottom, left and right region). For conciseness, the description is provided substantially with reference to only the left and top regions The left region (vertical direction) is shown containing four touch buttons 190-A through 190-D associated with the corresponding four choices displayed in menu display area 140. Similarly, four touch buttons 190-W through 190-Z are respectively associated with the four choices in the top (horizontal direction).

In general, touching (including, but not limited to, pressing, tapping, etc.) a touch button causes the specific touched button (or corresponding area) to be indicated, for example, to a processing unit (described in sections below). Accordingly, each touch button needs to be typically implemented with the associated electronics (hardware, firmware and/or software) to cause an indication to be provided. The touch buttons can span entire touch area 130. Touch buttons may be implemented in one of several known ways. While menu display area 140 and touch area 130 are shown as non-overlapping areas, it should be understood that the two areas can overlap substantially or entirely.

Users select one of the displayed choices by touching a corresponding select button. For example, touch button 190-A may be touched to select Checking account option. However, visually impaired people may not be able to see and thus unable to locate the touch buttons. The manner in which such people may conveniently perform a selection task is described below.

Guide structure 150 needs to be generally of a shape to guide a user finger (possibly more fingers or any object in general) along multiple points ("touch points"). The touch points are designed to provide a different sensation (compared to other points in the guide structure) when a user slides a finger on the touch points. In an embodiment, guide structure 150 is implemented as a semi-circular groove and each touch point is implemented as a small bump contained within the groove.

The implementation of alternative embodiments with other shaped guide structures and touch points will be apparent to one skilled in the relevant arts based on the disclosure provided herein. In one alternative embodiment, guide structure 150 is implemented using a projected structure and the touch points as further projections or depression points. Such alternative embodiments are contemplated to be within the scope and spirit of various aspects of the present invention.

Guide structure 150 is also shown containing reference point 160. Reference point 160 may provide a convenient point from which to count the relative positions of the menu choices in each direction (as described in further detail in sections below). Guide structure 150 is shown contained within border 120, which may be constructed using durable material such as metal.

Exits 180-A through 180-D are respectively associated with touch points 170-A through 170-D. Each exit leads to a corresponding touch button. Thus, exits 180-A through 180-D respectively lead to touch buttons 190-A through 190-D. In an embodiment, each exit opens guide structure 150 towards the corresponding touch button on touch screen 110. Assuming that touch points are close-by to touch buttons and persons can be trained to easily locate a touch button of interest (located at a fixed distance from corresponding touch point) from a corresponding touch point, embodiments can be implemented without including exists. Such embodiments are contemplated to be within the scope and spirit of various aspects of the present invention.

The description is continued with reference to an example in which a visually impaired person selects one of the menu options in portion 100 of FIG. 1.

3. Example Selection

In an embodiment, portion 100 is augmented by an audio unit to enable a visually impaired person ("person") to select a menu option. Selecting the 'Help' option (by touching on touch button 190-W) may cause the general instructions on selection (i.e., use of guide apparatus and touch points) to be read out. A general overview of the selection apparatus may also be provided. Selection of 'Call Attendant' option may cause any attendants to be notified that their assistance is being requested. Selection of 'End Session' option may end the session for the present user.

Selecting the 'Read' option (touch button 190-X) causes the menu options in the vertical direction to be read. The menu options may be read with the associated count number (1–4). A person may then start from reference point 160, slide the finger down counting the number of touch points traversed, and use the exit at the count associated with the menu choice of interest to select the corresponding touch button.

For example, assuming that a person is interested in selecting "3. Loan Account" (count=3), the person may start at reference point 160 and slide a finger past the first two touch points 170-A and 170-B (while feeling the different sensation and thus recognizing the points). When the third (equaling count) touch point is reached, the corresponding exit 180-C is used to select touch button 190-C. Thus, by using guide 150, a person may conveniently select a desired choice without having to rely on visual sense.

Various modification and/or enhancements may be provided to the approach described above. For example, a single touch of a touch button may cause the corresponding menu choice to be read out, and a second touch (or sustained placement) may cause the option to be selected.

The selection apparatus thus provided may be used in several types of transaction systems. Examples of such systems include, but not limited to, ATM machines, online check-in counters at the air ports, ticket vending kiosks, kiosks used for displaying product information, etc. The manner in which such systems may be implemented is described below with an example.

4. Example System

Figure 2:
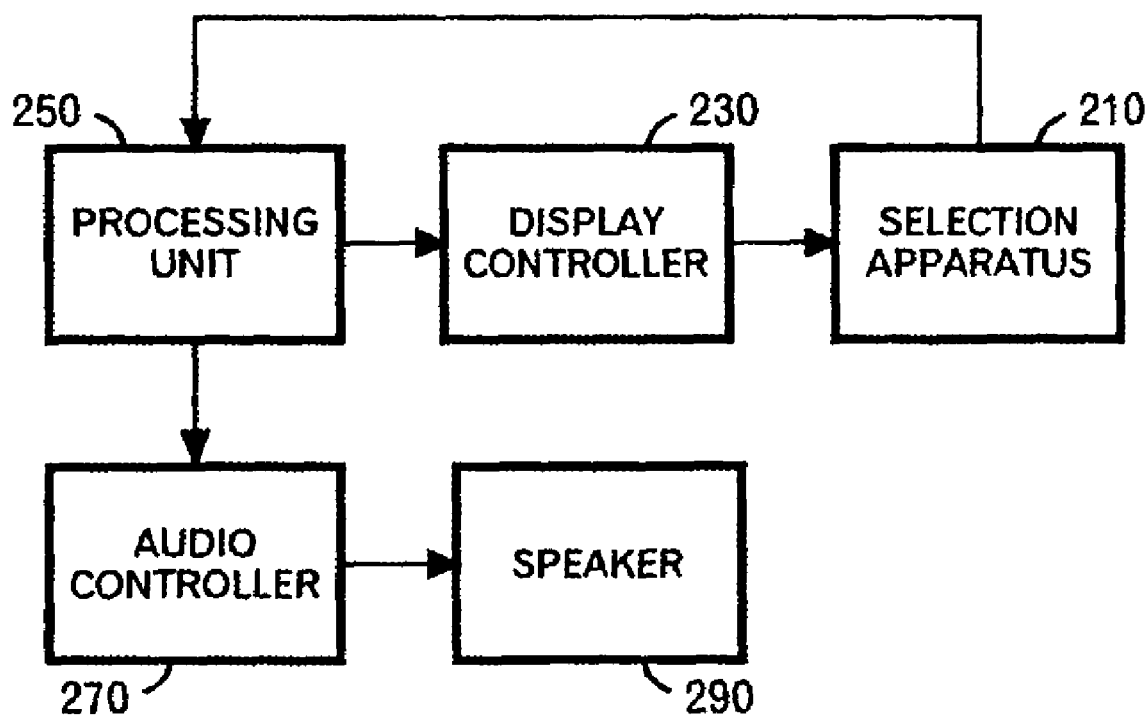
FIG. 2 is a block diagram illustrating an example system in which the present invention can be implemented.

FIG. 2 is a block diagram illustrating an example system in which the present invention can be implemented. The system is shown containing selection apparatus 210, display controller 230, processing unit 250, audio controller 270 and speaker 290. Each block is described in further detail below.

Selection apparatus 210 may be implemented using portion 100. Accordingly, selection apparatus 210 may be designed to receive (from display controller 230) display signals representing image frames containing multiple choices, and to display the image frames. In addition, when a user touches touch area 130, selection apparatus 210 sends digits (e.g., coordinates of the touch area or some other number which enables the touched point to be identified with the corresponding touch button) representing the area when the touch has been sensed.

Display controller 230 receives data (from processing unit 250) representing the content of image frames to be generated on selection apparatus 210, and generates display signals (for display in the display area of selection apparatus 210) based on the received data. Audio controller 270 receives data (from processing unit 250) representing the sounds to be generated using speaker 290, and generates the corresponding electrical signals to speaker 290. Display controller 230, audio controller 270 and speaker 290 may be implemented in a known way.

Processing unit 250 generates data containing various image frames to be displayed in the display area of selection apparatus 210. In general, the layout of the content of each image frame needs to take into account the specific locations at which the touch points are present, and other aspects of the user interface desired to be presented. The generated data is sent to display controller 230.

Processing unit 250 receives from selection apparatus 210 data representing the area touched by a user. In response, processing unit 250 coordinates and controls the operation of display controller 230 and audio controller 270 to generate images and sounds, for example, as described in the sections above. In general, processing unit 250 and display controller 230 contain processors which are implemented using hardware structures executing instructions (software, firmware, etc.) to provide various features of the present invention.

5. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A system comprising:

a touch screen containing a plurality of touch buttons;

a guide structure including a physical projection or groove to lead a finger along a plurality of touch points, wherein said plurality of touch points provide tactile sensations for a person guiding a finger along said guide structure, the tactile sensation of such a touch point being different than tactile sensations provided by the guide structure and the touch screen, including the touch buttons thereof, said plurality of touch points being respectively associated with corresponding ones of said plurality of touch buttons;

a processor so cause a plurality of choices to be displayed on said touch screen, wherein such a choice is displayed in association with a corresponding one of said plurality of touch buttons responsive to a person touching the touch button associated with the touch point; and a plurality of exits, the touch points being associated with respective ones of the exits, such an exit being interposed between the touch screen and the exit's touch point and including an exit structure for tactile leading of said finger from the exit's touch point to the touch screen and the touch point's associated touch button.

2. The system of claim 1, wherein said guide structure further comprises a reference point, and wherein said system further comprises a speaker to read out said plurality of choices, said plurality of choices being associated with respective numbers, each such number representing a number of touch buttons a corresponding choice is located from said reference point.

3. The system of claim 2, wherein said guide structure is contained in a border surrounding said touch screen, and wherein said touch points are also contained in said guide structure.

4. The system of claim 1, wherein for such a guide structure comprising a groove, each of said plurality of touch points comprises a bump in said groove.

5. The system of claim 4, wherein each of said plurality of exits opens said groove at a touch point to a corresponding touch button.

6. The system of claim 1, wherein for such a guide structure comprising a physical projection, each of said plurality of touch points comprises a depression.

7. The system of claim 1, wherein said touch screen comprises:

a display area for displaying said plurality of choices; and a touch area containing said touch buttons.

8. The system of claim 1, wherein said system comprises a transaction system.

* * * * *